Oct. 25, 1927.

H. BERNARD 1,646,743

WEATHERPROOF JOINT FOR WINDSHIELDS AND THE LIKE

Filed May 5, 1927

INVENTOR:
Harry Bernard
BY Redding, Greeley, O'Shea & Campbell
his ATTORNEYS

Patented Oct. 25, 1927.

1,646,743

UNITED STATES PATENT OFFICE.

HARRY BERNARD, OF ALLENTOWN, PENNSYLVANIA, ASSIGNOR TO INTERNATIONAL MOTOR COMPANY, OF NEW YORK, N. Y., A CORPORATION OF DELAWARE.

WEATHERPROOF JOINT FOR WINDSHIELDS AND THE LIKE.

Application filed May 5, 1927. Serial No. 188,878.

This invention relates to weather-strips and is concerned particularly with the provision of a weatherproof joint between the proximate edges of two sections of glass which are adapted for angular movement with respect to each other.

The invention may be conveniently ascertained by a description of its application to a vehicle windshield, of the type shown in the preferred embodiment, which has a fixed front section and movable side sections. The movable side sections are adapted at one of the edges to be hingedly mounted with the vehicle body so that their other edges may be swung into or out of proximity to free edges of the fixed front section.

It is well known that in practice it is difficult, if not impossible, to so mount such two relatively movable sections of glass that, when their free edges are brought into proximity, the joint will be sufficiently accurate to prevent the passage therethrough of a certain amount of wind and rain.

It is therefore an object of the present invention to provide means mounted on the proximate edges of two relatively movable sections of glass to insure a perfect joint so that wind, rain, etc., will be prevented from passing therethrough.

Figure 1:
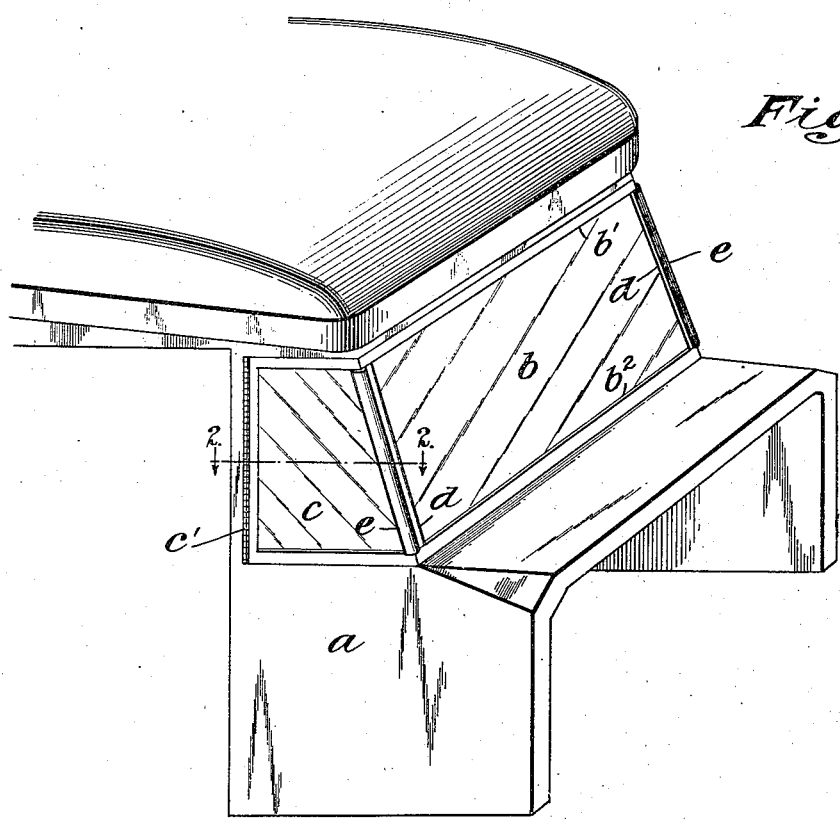
Figure 2:
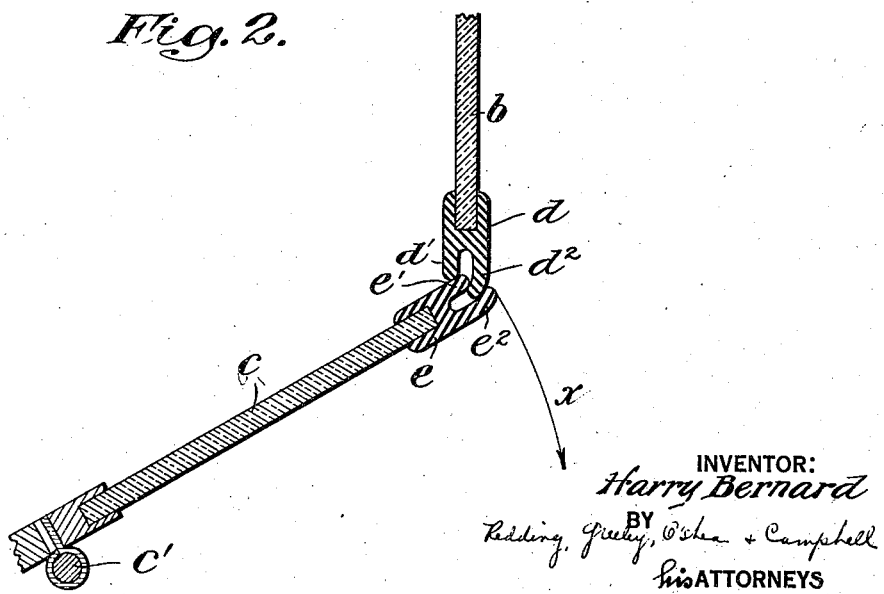

Accordingly the proximate edges of the fixed and movable sections of the above mentioned windshield, for example, may have mounted thereon strips of yielding non-metallic material so that, when the edges are brought together, the strips of non-metallic material will co-operate to form a completely weather-tight joint. In order to insure the desired co-operation of the two strips of non-metallic material they are formed with fingers or ridges which are designed to interlap in a manner which will become apparent from the following detailed description when read in connection with the accompanying drawings, in which:

Figure 1 is a view in perspective showing the invention as applied to a windshield of a vehicle body and Figure 2 is a detailed sectional view taken in a plane indicated by the line 2—2 in Figure 1.

In the drawings, $a$ represents in general a portion of a vehicle body, say a motor vehicle bus body. The windshield $b$ is mounted fixedly upon the body at its edges $b'$, $b^2$, the other edges being free. The side sections or windows $c$ are mounted hingedly on the body, as by means of the hinge $c'$, so that the window may be swung open or closed as desired. When the window is closed it is desirable that the proximate edges of the window and windshield co-operate to form a weather-tight joint so that wind, rain, etc. may be prevented from passing into the interior of the vehicle body. To this end the proximate edges of the window and the windshield are mounted with strips $d$, $e$, of yielding non-metallic material, such as rubber. These strips are formed with ridges or fingers $d'$, $d^2$, and $e'$, $e^2$, which are adapted to interlap in the manner shown in Figure 2. When the window is opened by swinging it in the direction indicated by the curved arrow $x$ the ridge or finger $e'$ will force the ridge or finger $d^2$ outwardly, thus disengaging the strips. When the window is again closed the ridge or finger $e'$ will force the longer ridge or finger $d^2$ inwardly and against the ridge or finger $d'$, thus allowing the shorter ridge or finger $e'$ to pass by it. When the ridge or finger $e'$ has passed by the ridge or finger $d^2$ the latter will snap back and lie against the ridge or finger $e^2$ and the ridges in general will assume the interlapping relationship shown in the drawings, thus providing a weatherproof joint between the proximate edges of the window and windshield. This action is attained by forming the ridges $d'$, $e'$, shorter than the relatively long ridges $d^2$, $e^2$. The strips are formed of yielding non-metallic material so that they can readily adapt themselves to compensate for any inaccuracies in the manufacture or mounting of the windshield and windows and so to provide an absolutely weather-proof joint between proximate edges thereof.

While the invention has been described as applied to a vehicle body windshield it is to be remembered that it is equally applicable in any situation where it is desired to provide a weather-tight joint between proximate edges of two relatively movable sections of glass or any other material. The various features of the invention will be particularly set forth in the appended claims but it is to be understood that no limitation is intended upon the scope of the invention except as indicated in the claims.

What I claim is:

1. In combination with two relatively movable sections having edges adapted to be moved into and out of proximity, strips of yielding non-metallic material mounted upon said edges, said strips being formed respectively with a relatively short ridge and a relatively long ridge, said ridges being adapted to interlap to form a weather-proof joint when the edges are moved into proximity, the long ridge of one strip lying between the short and long ridges of the other strip and the short ridge of the second strip lying between the short and long ridges of the first strip.

2. In combination with a fixed section having a free edge and a section movable with respect thereto and having a free edge adapted to be moved into proximity to the free edge of the fixed section, strips of yielding non-metallic material on the free edges of the respective sections, said strips being formed respectively with a relatively short ridge and a relatively long ridge, said ridges being adapted to interlap to form a weather-proof joint when the edges are moved into proximity, the long ridge of one strip lying between the short and long ridges of the other strip and the short ridge of the second strip lying between the short and long ridges of the first strip.

This specification signed this 28th day of April, A. D. 1927.

HARRY BERNARD.